United States Patent
Lippitsch

(10) Patent No.: US 6,835,156 B2
(45) Date of Patent: Dec. 28, 2004

(54) DIFFERENTIAL GEARBOX WITH LOCKING COUPLING AND DISTRIBUTOR GEARBOX FOR MOTOR VEHICLES EQUIPPED THEREWITH

(75) Inventor: Klaus Lippitsch, Graz (AT)

(73) Assignee: Steyr Powertrain AG & Co KG, Graz (AT)

( * ) Notice: Subject to any disclaimer, the term of this patent is extended or adjusted under 35 U.S.C. 154(b) by 95 days.

(21) Appl. No.: 10/203,828

(22) PCT Filed: Feb. 8, 2001

(86) PCT No.: PCT/AT01/00031
§ 371 (c)(1),
(2), (4) Date: Oct. 9, 2002

(87) PCT Pub. No.: WO01/59331
PCT Pub. Date: Aug. 16, 2001

(65) Prior Publication Data
US 2004/0077450 A1 Apr. 22, 2004

(30) Foreign Application Priority Data
Feb. 10, 2000 (AT) ........................................ GM 94/2000

(51) Int. Cl.⁷ .............................................. F16H 48/06
(52) U.S. Cl. ........................ 475/244; 475/150; 475/201; 475/204; 475/206; 475/221
(58) Field of Search ................................ 475/150, 201, 475/204, 206, 221, 223, 230, 243, 244

(56) References Cited

U.S. PATENT DOCUMENTS

| 4,950,214 A | | 8/1990 | Botterill | |
| 5,655,986 A | * | 8/1997 | Wilson et al. | 475/204 |
| 5,911,643 A | * | 6/1999 | Godlew et al. | 475/150 |
| 6,561,939 B1 | * | 5/2003 | Knapke | 475/150 |
| 6,620,071 B1 | * | 9/2003 | Cook et al. | 475/221 |

FOREIGN PATENT DOCUMENTS

| EP | 0 414 086 | | 9/1991 |
| JP | 11-270654 | * | 10/1999 |

* cited by examiner

Primary Examiner—Ha Ho
(74) Attorney, Agent, or Firm—Bachman & LaPointe, P.C.

(57) ABSTRACT

A differential transmission comprises a differential casing (16) driven by an input shaft and having compensating gears (20) mounted therein, and in each case having an output gear (21, 22) to drive a first and a second output shaft (3, 4), it being possible for the differential casing to be connected to one of the output shafts (3, 4) via a friction clutch (12) by pressure being applied to a pressure plate (29). In order not to have to introduce any actuating forces, into the cawing and to achieve the short switching times required for electronic slip regulation, the differential provides for the axial displacement of the pressure plate (29), two rings (31, 32) decoupled in terms of rotation with balls (33) between them are provided, of which at least one has ramps that rise in the circumferential direction, and both rings (31, 32) each have a ramp lever (35, 36) whose free end (37, 38) interacts with a control unit (11), which has electric drive means (46, 54) and moves the ramp levers in opposite directions.

8 Claims, 3 Drawing Sheets

DIFFERENTIAL GEARBOX WITH LOCKING COUPLING AND DISTRIBUTOR GEARBOX FOR MOTOR VEHICLES EQUIPPED THEREWITH

BACKGROUND OF THE INVENTION

The invention relates to a differential transmission comprising a differential casing driven by an input shaft and having compensating gears mounted therein, and in each case having an output gear to drive a first and a second output shaft, it being possible for the differential casing to be connected to one of the output shafts via a friction clutch by pressure being applied to a pressure plate.

By means of the friction clutch, the differential transmission can be locked. This locking action can be both "on/off" and also continuously adjustable. For the purpose of locking, the coupling is actuated, which requires considerable actuating forces. These forces are normally applied hydraulically. However, hydraulic actuation is too slow to disengage the clutch in the short switching time necessary for electronic slip limitation. In addition, passenger automobiles do not have a hydraulic system. Non-hydraulic actuation, by means of electric means and mechanical transmission, has hitherto failed on the high actuating forces which had to be introduced into the casing via bearings.

In addition, in the case of electrical actuation, the question is always posed regarding operational safety in the event of failure of the electric means. If a lockable differential is used in a transfer box of an all-wheel drive vehicle with an off-highway gear stage, there is the additional problem of controlling this as well so that it is still coordinated with the differential lock.

It is therefore an object of the invention to provide a lockable differential which avoids the disadvantages listed above; no actuating forces are to be introduced into the casing, the short switching times required for electronic slip limitation should be achievable, and all that with the smallest possible outlay on construction and in an inherently safe manner.

SUMMARY OF THE INVENTION

According to the invention, the foregoing object is achieved wherein a) for the axial displacement of the pressure plate, two rings decoupled in terms of rotation with balls between them are provided, of which at least one has ramps that rise in the circumferential direction, b) both rings each have a ramp lever whose free end interacts with a control unit, which has electric drive means and moves the ramp levers in opposite directions.

The ring rotationally decoupled from each other and from the shaft bearing them can be rotated with respect to each other by means of their ramp levers, no actuating forces having to be dissipated to the casing, because of their opposite movement. The rising ramps in the ring or rings require only a very small relative rotation for high actuating forces, so that, in interaction with the electrical actuation, very short switching times are achieved.

In preferred embodiments, the control unit has a control disk that be rotated by means of a geared electric motor, and the axis of rotation of the control disk is aligned in the direction of movement of the free ends of the two ramp levers.

The invention also relates to a transfer box for motor vehicles, having a differential transmission as claimed in one of the preceding claims and having an off-highway gear stage which can be engaged as a result of axial displacement of one of its elements. In order also to control the off-highway gear stage in as coordinated a manner as possible, with the lowest effort and intrinsically safely, the invention provides that a) the control unit comprises a carrier shaft driven by the geared motor, a changeover sleeve which is firmly connected to said carrier shaft so as to rotate with it but is displaceable, the control disk rotatably mounted on the carrier shaft and a control pinion, likewise rotatably mounted on said carrier shaft, for changing over the off-highway gear stage, b) it being possible for the changeover sleeve to be displaced by means of an electromagnet and the changeover sleeve having first and second coupling teeth, by means of which it produces the drive connection to the control disk or to the control pinion as desired.

With this configuration, using a single control unit and a single motor, both the differential lock and the off-highway gear stage can be driven as desired in an intrinsically safe manner. In addition, costs are saved, and also overall space, which is tight in a transfer lock. Furthermore, it is ensured that the two cannot be selected at the same time and that, in the event of failure of the control unit, the lock is released.

In an advantageous development, the electromagnet is a three-position magnet, which displaces the changeover sleeve by means of a selector fork, and the changeover sleeve has switching teeth with a repellent engagement angle. As a result, in the event of a failure of the electromagnet, the coupling disengages automatically, with the effect of intrinsically safe actuation.

Furthermore, in that differential casing, in addition to the compensating gears, planet gears of the off-highway gear stage are mounted, which mesh firstly with a drive sunwheel and secondly with an internal gear, it being possible for the internal gear to be displaced in the axial direction.

In an advantageous development, in each case a locking disk with at least one locking recess is firmly connected to the hub of the control disk and with the control pinion, and interacts with a locking element that is coupled to the changeover sleeve, which locking element has a locking tooth on each side, so that the locking tooth engages in the locking recess in the locking disk when the control disk is disengaged, and so that the locking tooth engages in the locking recess in the locking disk when the control pinion is disengaged. In this way, without any external action, the inherent safety is produced in that the respectively disengaged output element is locked and can be disengaged only after a shifting action has been completed.

BRIEF DESCRIPTION OF THE DRAWINGS

The invention will be described and explained below using figures, in which.

DETAILED DESCRIPTION

Figure 1:
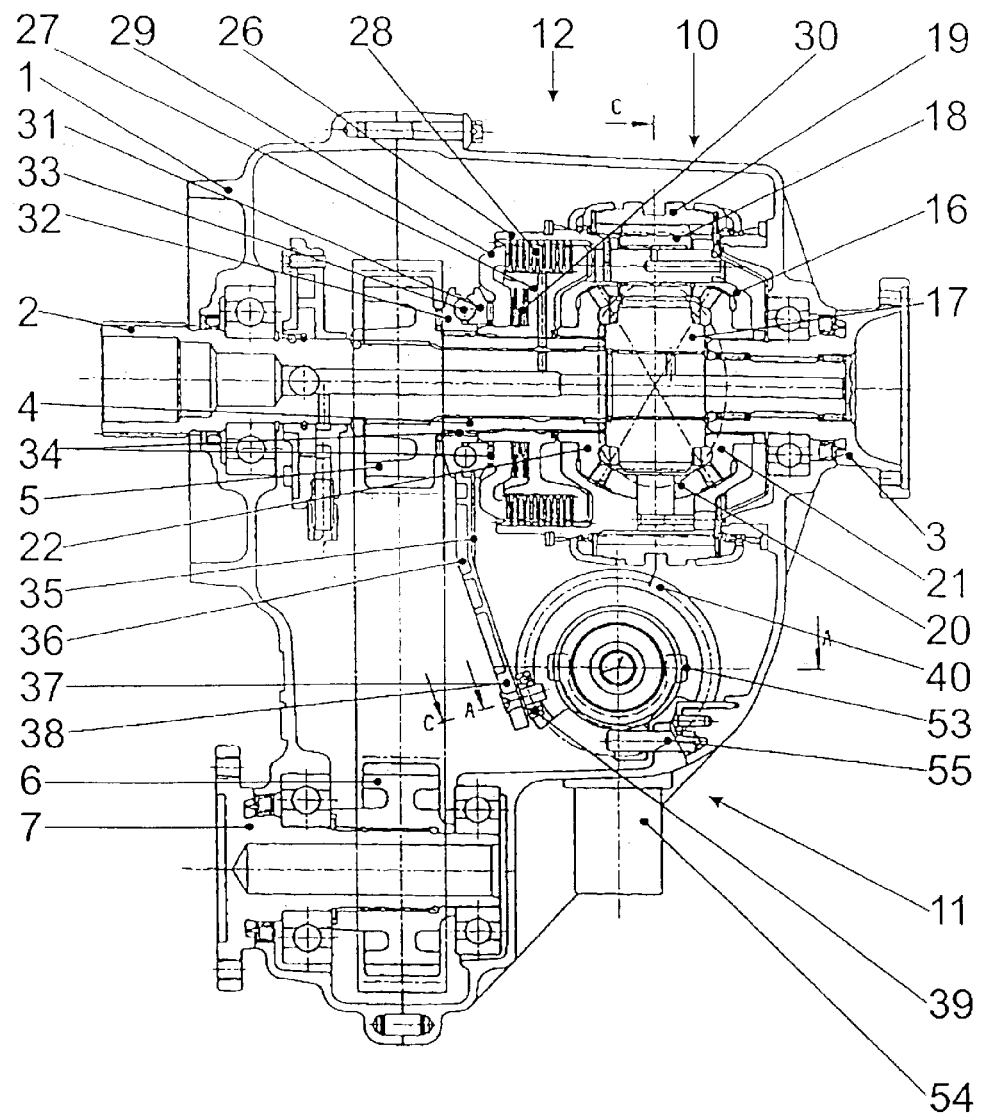
FIG. 1 shows a section through an exemplary embodiment of a transfer box according to the invention, having the differential according to the invention.

In FIG. 1, the casing of a transfer box is designated overall by 1, an input shaft coming from the drive unit (not shown)

of the vehicle is designated by 2, a first output shaft with a drive connection to the rear axle is designated by 3, and a second output shaft with a drive connection to the front axle (likewise not shown) is designated by 4. The second output shaft 4 uses a first tooth belt pulley 5 to drive a second tooth belt pulley 6 under the input shaft 2, which is seated on an output shaft 7 to drive the front axle.

In order to distribute the torque to the two output shafts 3, 4, a differential transmission designated overall by 10 is provided. Also provided are a control unit 11 under the differential transmission 10 and a locking clutch 12 for locking the differential transmission 10. In the exemplary embodiment shown, the locking clutch is combined structurally with the differential transmission 10. However, it could also be arranged separately, even somewhere else in the transfer box or in the drive train. In addition, the differential transmission itself can be designed very differently within the scope of the invention.

Figure 2:
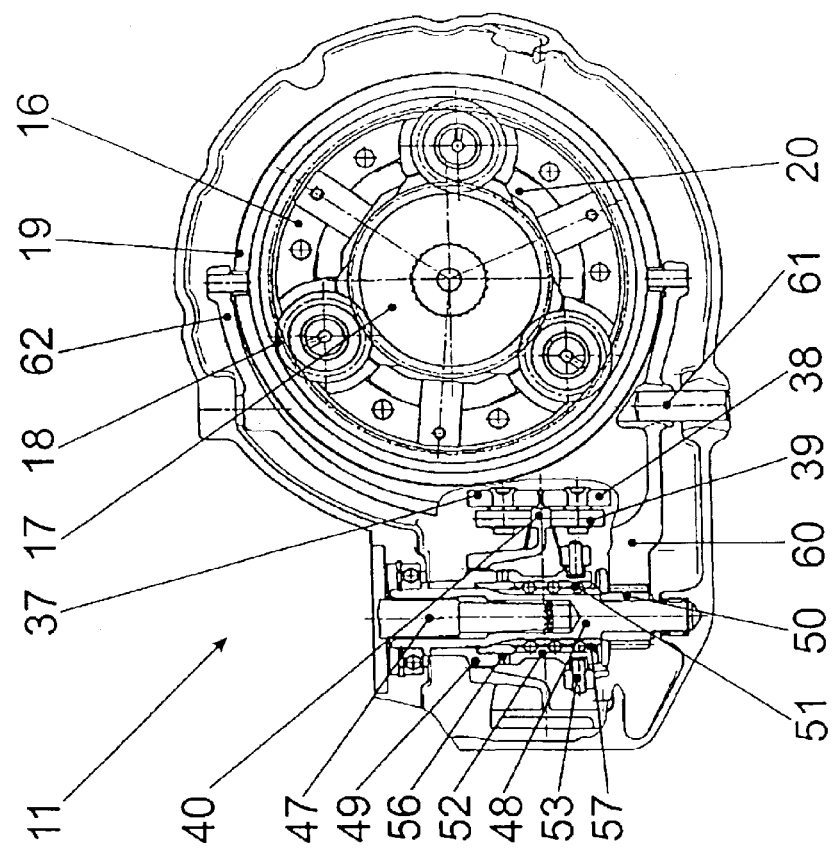
FIG. 2 shows a section according to CC in FIG. 1.

In FIG. 1 and FIG. 2, an exemplary and particular embodiment of the differential transmission can be seen. In the interior of the differential casing 16, which serves as a planet carrier here at the same time, there is a sun gear 17 firmly connected to the input shaft 2 so as to rotate with it, planet gears 18 rotatably mounted in the differential casing 16 and belonging to the off-highway gear stage, and first compensating gears 21 and second compensating gears 22. The first (21) are firmly connected to the first output shaft 3 so as to rotate with it, and the second (22) are firmly connected to the second output shaft 4 so as to rotate with it. The differential casing 16 is surrounded by an internal gear 19, which can be displaced axially and, in the off-highway gear, is firmly connected to the differential casing 16 so as to rotate with it. This particular embodiment of the differential transmission 10 is the subject of Austrian patent 405 157 and is described extensively there in terms of its construction and function.

The locking clutch 12 is also shown in detail in FIG. 1. It comprises a clutch casing 26, which is firmly connected to the differential casing 16 or, here, is even in one piece therewith, an inner clutch part 27 which is firmly connected to the second output shaft 4 so as to rotate with it, a plate pack 28, and a pressure plate 29, which is loaded in the opening direction by return springs 30. Arranged between the pressure plate 29 and the second output shaft, here in particular the first toothed belt pulley 5 seated on the latter, are two rings 31, 32. Between these rings 31, 32, there are balls 33 in corresponding circumferential grooves. These circumferential grooves are formed in one of the rings or in both as ramps, so that in the event of relative rotation of the two rings in relation to each other, an axial force is produced by the balls running up on the ramp. Two rings 31, 32 are entirely stationary when the clutch is not actuated. For the purpose of rotational decoupling, therefore, both rings 31, 32 are mounted on needle bearings 34. The first ring 31 has a first ramp lever 35, the second ring 32 has a second (36), which are firmly connected at one end to the ring, project downward and have rollers 39 at their free ends 37, 38. Between the two rollers 39 there is a rotatable control disk 40. When this control disk is rotated, the rollers 39 are moved apart, and the rings 31, 32 are rotated with respect to each other by the ramp levers 35, 36 moved in the manner of scissors.

Figure 3:
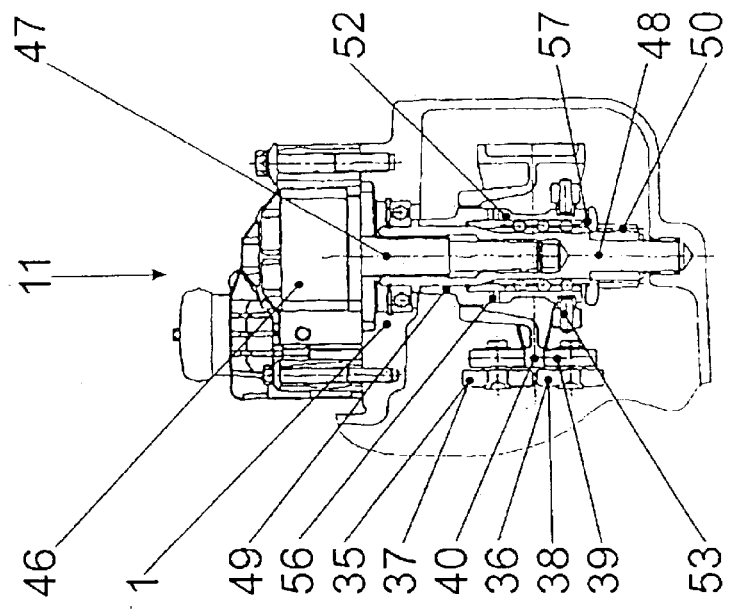
FIG. 3 shows a section according to AA in FIG. 1.

In FIG. 2 and FIG. 3, a geared electric motor is designated by 46, of which the motor output shaft 47 rotates at a correspondingly reduced speed when the motor is running. Firmly connected to said shaft so as to rotate with it is a carrier shaft 48 pushed onto it in the manner of a sleeve, which is mounted on both sides in the casing 1. Rotatably mounted on the carrier shaft 48 are the hub 49 of the control disk 40 and pinion 50. Between the hub 49 and the pinion 50, a changeover sleeve 52 is fitted to the carrier shaft 48 by means of a spherical longitudinal guide 51 such that it rotates with said carrier shaft 48 but can be displaced in the longitudinal direction. The changeover sleeve 52 is displaced by means of a changeover fork 53, which is actuated by a changeover magnet 54 (FIG. 1) via a lever mounted in a changeover fork axis 55 (FIG. 1). At its two axial ends, the changeover sleeve 52 has first switching teeth 56 to be connected firmly to the hub 49 so as to rotate with it, and second switching teeth 57 to be firmly connected to the pinion 50 so as to rotate with it. The switching teeth 56, 57 are coupling teeth with a repelling engagement angle.

The pinion 50 meshes with a toothed segment 60, which is part of a selector fork 62 that can be pivoted about a swing axis 61 in the casing and by means of which the internal gear 19 is displaced in order to change over to the off-highway gear.

By means of this displaceable changeover sleeve, the same geared motor 46 can be used as desired either to block the differential or to change over to the off-highway gear, but never both simultaneously. In the event of failure of the changeover magnet 54, the changeover sleeve 52, if it is currently engaged with the hub 49 or the pinion 50, is forced into the disengaged position by the repelling engagement angle of the switching teeth 56, 57 and their opposing teeth. In this way, the differential lock is reliably released in the event of failure of the magnet. If, starting from the neutral position of the changeover sleeve 52, either the differential is locked or a change into the off-highway gear is made, then, as a result of an action on the switching magnet 54 designed as a three-position magnet, said changeover sleeve 52 is firmly connected either to the hub 49 or to the pinion 50 so as to rotate with it. The appropriate adjustment is then performed by switching on the motor.

Figure 4:
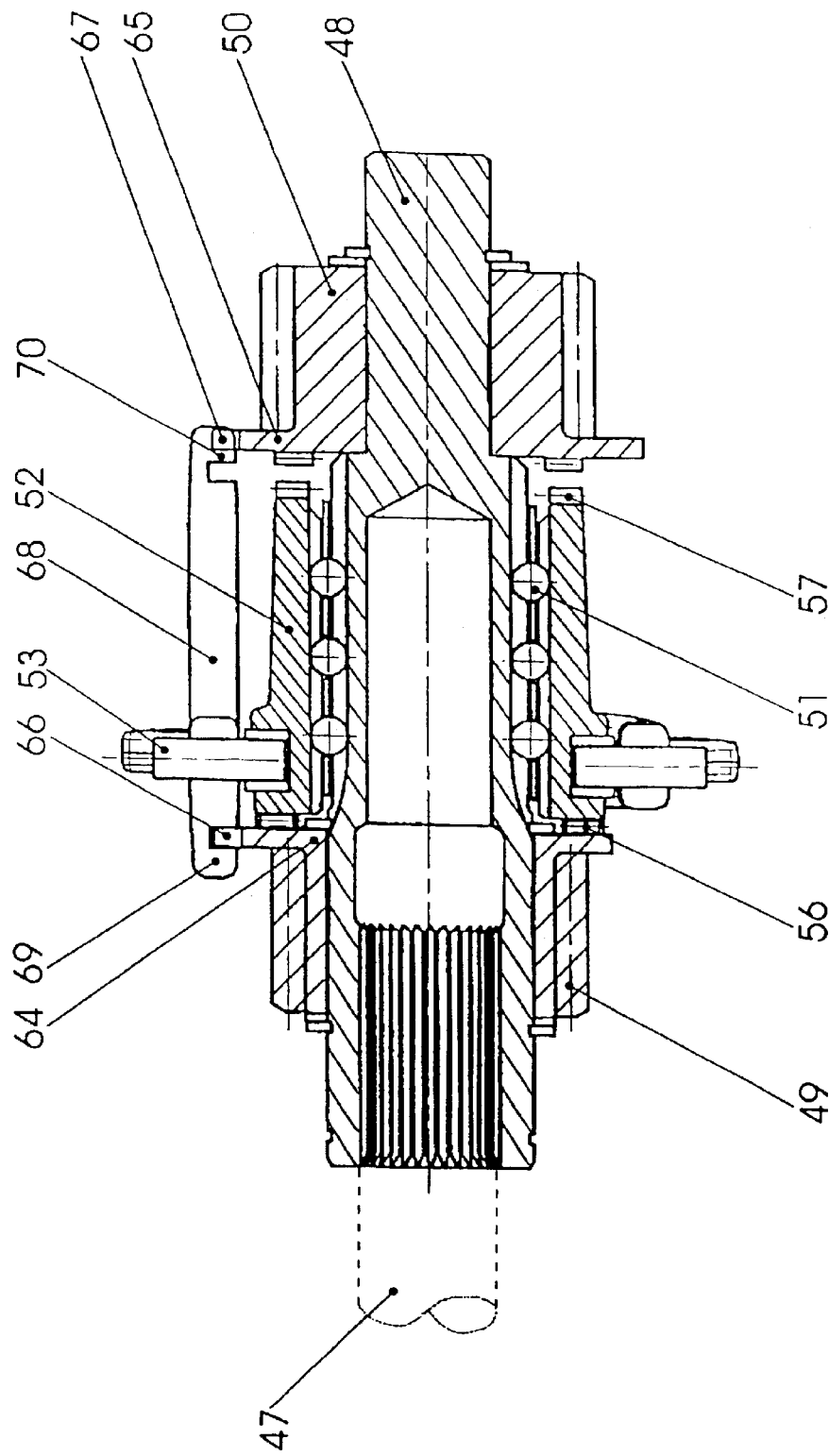
FIG. 4 shows an alternative detail from FIG. 3, somewhat enlarged.

FIG. 4 shows a modified embodiment of the control unit 11. On the carrier shaft 48, the hub 49 of the control disk 40 is rotatably mounted on one side, and the control pinion 50 is rotatably mounted on the other side. The hub 49 is firmly connected to or in one piece with a first locking disk 64, and the control pinion 50 is firmly connected to or in one piece with a second locking disk 65. The locking disks 64, 65 have at least one locking recess 66, 67 on their outer circumference, which interact with a locking element 68 coupled to the changeover sleeve 52. Said element can be in one piece with or connected with the changeover lever 53 in such a way that it follows the movement of the latter in the longitudinal direction.

The locking element 68 has a first locking tooth 69 engaging over the locking disk 64 on the side of the hub 49, and a second locking tooth 70 engaging over the locking disk 65 on the side of the control pinion 50. The first locking tooth 69 does not engage in the first locking recess 65 when the hub 49 is coupled with the changeover sleeve 52, and the locking disk 64 can rotate without hindrance. In this position of the locking element 68, the control pinion 50 is disengaged and the second locking tooth 70 engages in the second locking recess 67, so that the control pinion 50 is locked.

Then, after the control disk 40 has completed its actuating movement, if a change is intended to be made to an adjustment by means of the control pinion 50, the changeover fork 52 is displace to the right in the figure. When the control disk 40 has properly completed its actuating movement, the locking tooth 69 can engage in the locking recess 66 and in this way locks the control disk 40. At the same time, on the other side, the locking tooth 70 is displaced to the right, out of the locking recess 67, and the changeover sleeve 52 engages with its coupling toothing 57 in the associated coupling toothing on the control pinion 50. The latter is therefore unlocked and engaged.

What is claimed is:

1. A differential transmission comprising a differential casing (16) driven by an input shaft and having compensating gears (20) mounted therein, and having first and second output gears (21, 22) to drive a first and a second output shaft (3, 4), respectively, wherein the differential casing is connected to one of the output shafts (3, 4) via a friction clutch (12) by pressure being applied to a pressure plate (29), wherein
   a) for the axial displacement of the pressure plate (29), two rings (31, 32) decoupled in terms of rotation with balls (33) between them are provided, of which at least one has ramps that rise in the circumferential direction,
   b) both of said rings (31, 32) each has a ramp lever (35, 36) whose free end (37, 38) interacts with a control unit (11), which has electric drive (46, 54) and moves the ramp levers in opposite directions.

2. The differential transmission as claimed in claim 1, wherein the control unit (11) has a control disk (40) that can be rotated by means of a geared electric motor (46).

3. The differential transmission as claimed in claim 2, wherein the axis of rotation of the control disk (40) is aligned in the direction of movement of the free ends (37, 38) of the two ramp levers (35, 36).

4. A transfer box for motor vehicles, having a differential transmission as claimed in one of claims 2 and 3, and having an off-highway gear stage which can be engaged by means of axial displacement of one of its elements (19), wherein
   a) the control unit (11) comprises a carrier shaft (48) driven by the electric drive (46), a changeover sleeve (52) which is firmly connected to said carrier shaft (48) so as to rotate with it but is displaceable, the control disk (40) rotatably mounted on the carrier shaft (48) and a control pinion (50), rotatably mounted on said carrier shaft (48), for changing over the off-highway gear stage,
   b) it being possible for the changeover sleeve to be displaced by means of an electromagnet and the changeover sleeve having coupling means for producing the drive connection to the control disk or to the control pinion as desired.

5. The transfer box as claimed in claim 4, wherein the electromagnet (54) is a three-position magnet, which displaces the changeover sleeve (52) by means of selector fork (53).

6. The transfer box as claimed in claim 4, wherein the coupling means comprise first and second coupling teeth (56, 57) with a repulsive engagement angle.

7. The transfer box as claimed in claim 4, wherein in the differential casing (16), in addition to the compensating gears (20), planet gears (18) of the off-highway gear stage are mounted, which mesh firstly with a drive sun gear (17) and secondly with an internal gear (19), it being possible for the internal gear to be displaced in the axial direction.

8. The transfer box as claimed in claim 4, wherein in each case a locking disk (64, 65) with at least one locking recess (66, 67) is firmly connected to the hub (49) of the control disk (40) and with the control pinion (50), and interacts with a locking element (68) that is coupled to the changeover sleeve (52), said locking element (68) has a locking tooth (67, 70) on each side, so that the locking tooth (69) engages in the locking recess (66) in the locking disk (64) when the control disk (40) is disengaged, and so that the locking tooth (70) engages in the locking recess (67) in the locking disk (65) when the control pinion (50) is disengaged.

* * * * *